May 3, 1966 W. Z. SALCER 3,248,757
APPARATUS FOR MAKING PLASTIC ARTICLES
Original Filed March 25, 1963 3 Sheets-Sheet 1
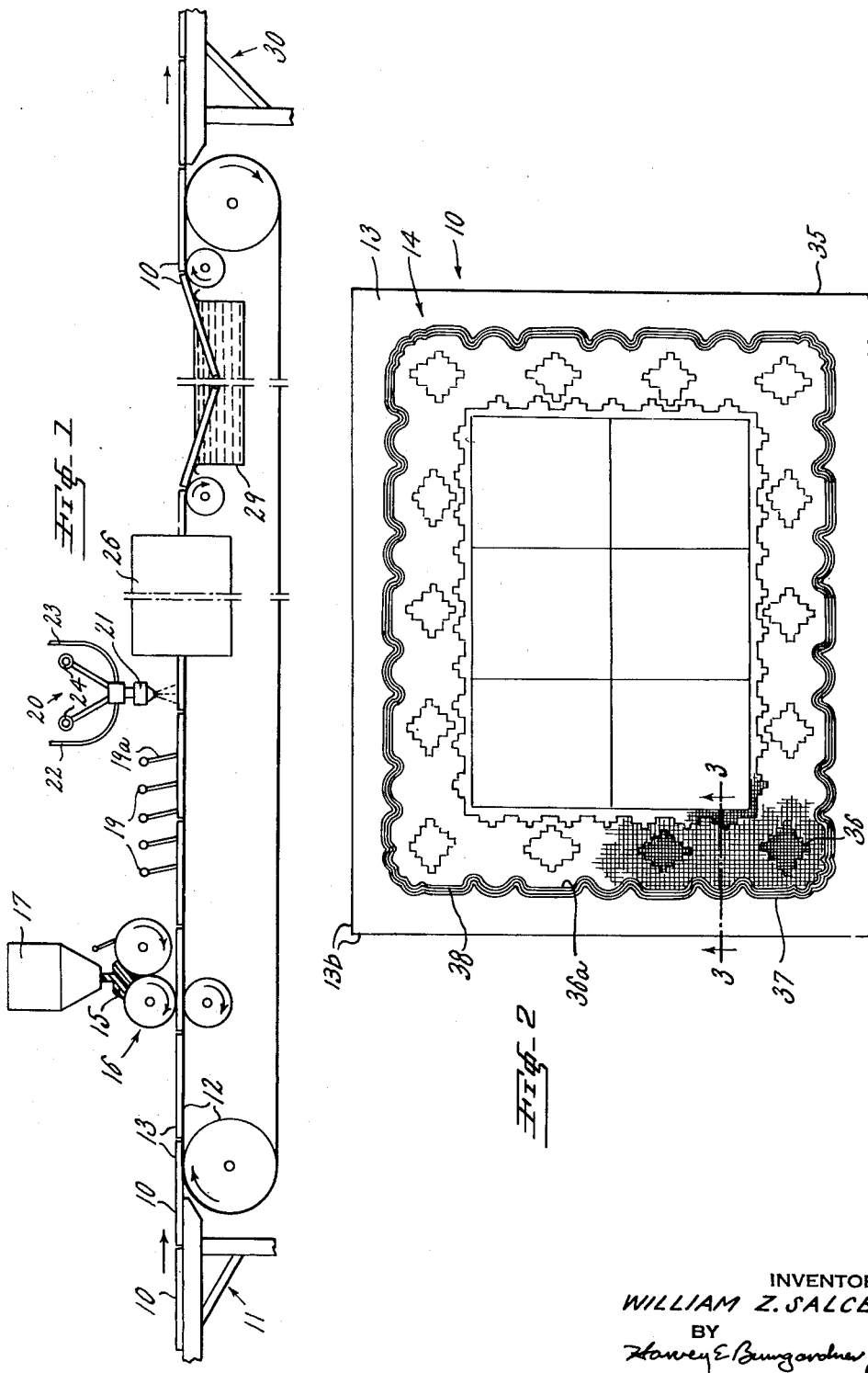
INVENTOR
WILLIAM Z. SALCER
BY
Harvey E. Bumgardner Jr.
ATTORNEY May 3, 1966 W. Z. SALCER 3,248,757
APPARATUS FOR MAKING PLASTIC ARTICLES
Original Filed March 25, 1963 3 Sheets-Sheet 2
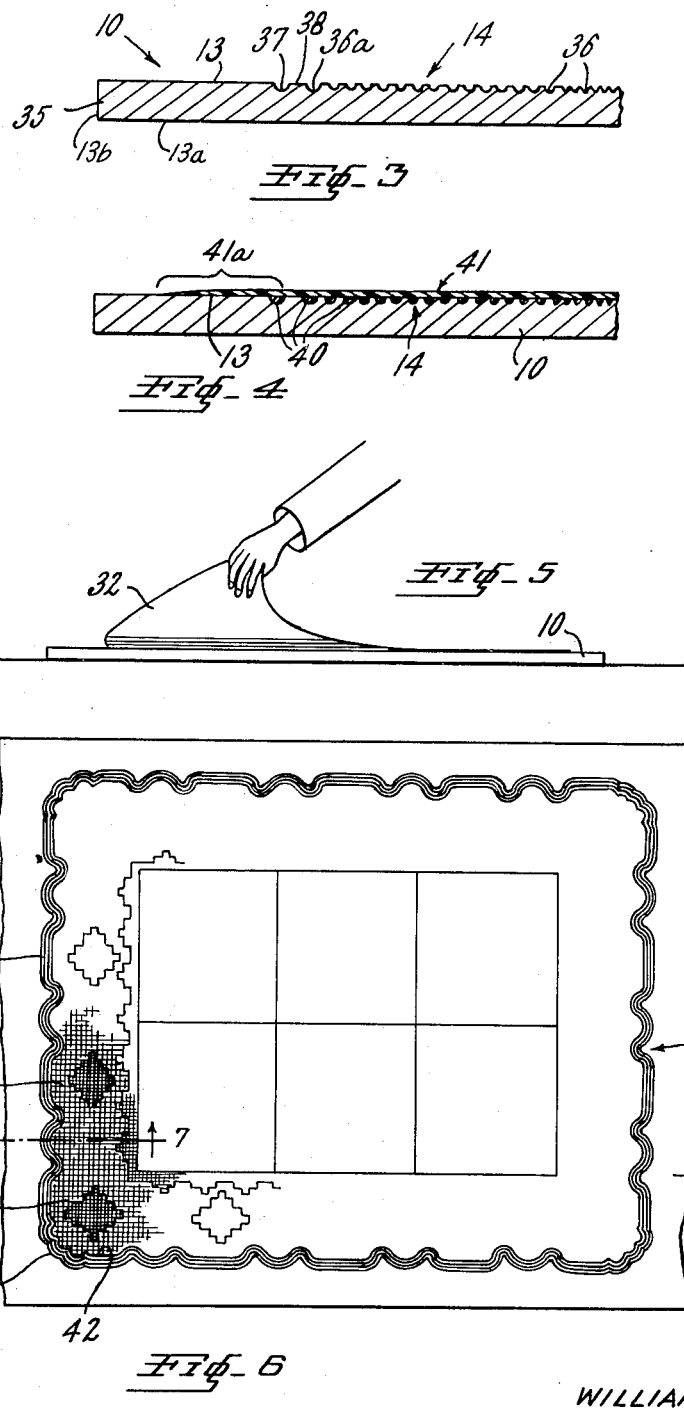

May 3, 1966 W. Z. SALCER 3,248,757
APPARATUS FOR MAKING PLASTIC ARTICLES
Original Filed March 25, 1963 3 Sheets-Sheet 3
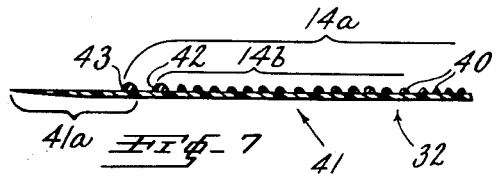
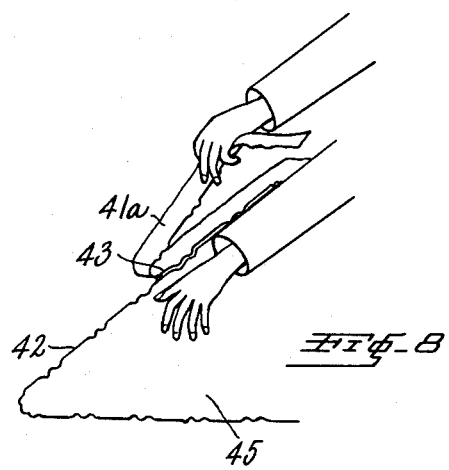
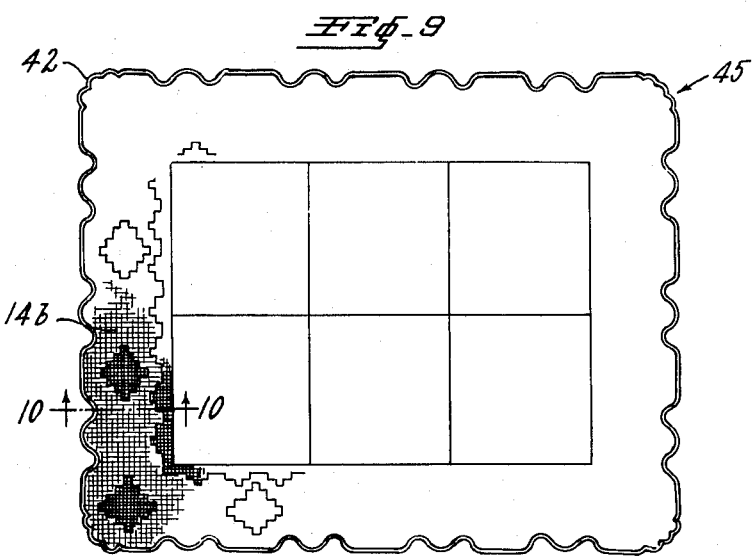
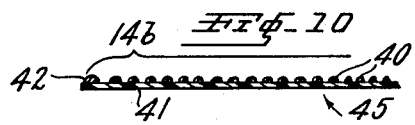
INVENTOR
WILLIAM Z. SALCER
BY
Harvey E. Bumgardner
ATTORNEY

United States Patent Office 3,248,757
Patented May 3, 1966

3,248,757
APPARATUS FOR MAKING PLASTIC ARTICLES
William Z. Salcer, Rego Park, N.Y., assignor to B. & S. Plastic Art, Inc., Jersey City, N.J., a corporation of New Jersey
Original application Mar. 25, 1963, Ser. No. 267,755, now Patent No. 3,150,216, dated Sept. 22, 1964. Divided and this application June 26, 1964, Ser. No. 378,248
6 Claims. (Cl. 18—39)

This application is a division of my application Serial No. 267,755, filed March 25, 1963, now U.S. Patent No. 3,150,216, issued September 22, 1964.

This invention relates to a mold particularly suited for manufacturing flexible sheet like articles having a raised pattern on one surface thereof. More particularly, it relates to a mold for the manufacture, from plastic materials, of such articles as tablecloths, place mats, doilies, shower curtains, drapes, aprons and the like comprised of a perforated lace like, three dimensional plastic pattern bonded to a backing sheet of flexible plastic material or to a layer of plastic foam or to both. Said invention further relates to a mold or die in which said pattern can be formed and to which said plastic sheet or foam layer can thereafter be applied. The plastic materials with which this invention may be useful include soft rubbers as well as a variety of flexible thermoplastic and thermosetting materials.

Small place mats having a perforated lace like raised pattern bonded to a backing sheet of contrasting color have been on the market prior to this invention. But where, as in many lace patterned articles, it is desired to provide an article having irregular or scalloped edges on a large article, serious problems have heretofore been encountered in the economical manufacture of such articles. These problems have particularly resulted from conforming the edges of the backing sheet or layer to the indentations of the edges of the lace like pattern.

Accordingly, it is an object of the present invention to provide a new and improved mold or die for manufacturing articles of the character described herein.

It is another object of this invention to provide a novel mold for manufacturing flexible, sheet like articles comprised of a lace like three dimensional pattern bonded to a backing sheet or layer of contrasting color, all from plastic materials, particularly where said pattern has irregular or indented edges and it is desired to conform the edges of said backing sheet or layer to the edges of said pattern.

It is a further object of this invention to provide a mold for the manufacture of an intermediate article of manufacture having a structure particularly suited to the fast, economical removal of unwanted backing material from around the edges of said backing sheet or layer to conform the edges of said backing sheet or layer to the edges of said pattern.

For a better understanding of the present invention together with other and further objects thereof, reference is had to the following description, taken in connection with the accompanying drawings, and its scope will be pointed out in the appended claims.

In the drawings:

FIG. 1 is a diagrammatic representation of apparatus suited to the employment of the mold of this invention.

FIG. 2 is a top plan view of the mold or die of this invention showing the edges of the die pattern engraved thereon and showing, in a fragmentary manner and schematically the die pattern engraved within said edges.

FIG. 3 is a sectional view of a portion of said mold taken on line 3—3 of FIG. 2.

FIG. 4 is a sectional view similar to FIG. 3, but showing both the pattern material and the backing material applied to the mold.

FIG. 5 is a schematic view of the step of stripping the intermediate article from the mold of this invention.

FIG. 6 is a plan view of the intermediate article of manufacture formed by the mold of this invention showing the edges of the intermediate pattern thereon and a fragmentary, schematic representation of the finished pattern within said edges.

FIG. 7 is a sectional view of a portion of said intermediate article taken along line 7—7 of FIG. 6.

FIG. 8 is a schematic fragmentary representation of the step of separating unwanted backing material from the finished article.

FIG. 9 is a plan view of the finished article showing a fragmentary, schematic representation of the finished pattern thereon.

FIG. 10 is a sectional view on line 10—10 of FIG. 9.

Referring now to the drawings wherein like reference numerals denote corresponding elements throughout the several views, and particularly to FIG. 1, in the practice of applicant's method, a succession of plate type molds or dies 10, each similar to that shown in FIG. 2, are fed from a loading station 11 onto a moving endless conveyor means 12, each of the molds 10 being positioned on said conveyor means 12 with its molding surface 13 bearing the engraved die pattern 14 uppermost.

Passing along the conveyor means 12 the molding surface 13 of each successive mold 10 is coated with a first or pattern layer of plastic material 15 by the reverse roll coater 16 to which said plastic material is continuously supplied from a suitable reservoir 17. While, as explained elsewhere herein, my invention would be useful in the manufacture of articles from a variety of plastic materials, a vinyl dispersion plastisol has been found well suited as a raw material in the practice of the invention. This first layer of plastic material 15 completely fills the die pattern 14 on the molds 10 with excess material deposited on the molding surfaces 13 of said molds 10.

The coated molds 10 next are moved progressively beneath a series (five are shown here for purposes of illustration) of doctor blades 19 which gradually wipe the excess plastic material of the first layer from the molding surface 13 of each mold 10. As each mold 10 leaves the downstream doctor blade 19a, its molding surface 13 has been wiped clean of excess material leaving only the die pattern 14 completely filled with the plastisol.

Next, each mold 10 is successively passed beneath a means 20 for applying a backing layer of plastic material to the molding surface 13 of said mold 10. For illustrative purposes said means 20 has been shown in FIG. 1 as a transversely reciprocating spray nozzle 21 fed by flexible hoses 22 and 23 with air and plastisol respectively. By means of the transversely reciprocating motion of the nozzle 21 along the guides 24, a uniform second layer of plastic material is applied to the entire molding surface 13 of each mold 10. It should be appreciated that various alternative means could be used for applying the second or backing layer to the molds 10, said alternative means including a stationary spray system, a roll coater or even lamination before curing or after a partial cure, it being essential only that the second layer material be compatible with the first layer material in the die pattern 14 so that it may be completely bonded therewith. Most desirable decorative effects are obtained when the second layer is of a color contrasting with the color of the first or pattern layer.

Next, each mold 10, bearing both layers of plastic material, is conveyed through a tunnel type oven 26 where the plastic material is cured in and on the molds 10. With the vinyl plastisol used by me for both layers, a curing time of 130 seconds at 390° F. has been found to be desirable under normal conditions.

As the molds 10 bearing the semi-finished plastic articles 32 emerge from the oven 26 they may be cooled by various means including fans, water sprays and/or water immersion. For illustrative purposes, in FIG. 1 the molds 10 are shown to be cooled by successively immersing them in a tank 29 of water. After cooling, the molds 10 may be removed from the conveyor means 12 to a stripping station 30 where the semi-finished article 32 may be stripped manually from the mold 10 as shown in FIG. 5. After the molds 10 have been stripped they may be washed and returned, by other conveying means, to the loading station 11, the entire process heretofore described being continuously and automatically performed except for the manual mold stripping step.

It will be useful at this point to consider the detailed structure of the mold or die 10 of this invention and of the semi-finished article 32 stripped therefrom before continuing with a description of the final method step in the utilization of the mold of this invention. Referring, then, particularly to FIGS. 9 and 10 the pattern 14b of the desired finished article 45 exhibits a truly lace like appearance in that, as in a textile lace or piece of open crocheted work, the individual yarns or stitches are visibly reproduced. Further the outer edge 42 of the desired finished pattern 14b is defined by a continuous bead simulating a continuous strand of chain stitching or the like which follows a series of intricate indentations around the periphery of the desired finished article 45. It is to such a series of border indentations that it is generally desired to have the second or backing sheet or layer 41 of the article 45 conform.

To achieve this end a plurality of molds or dies 10, an example of which is shown schematically in FIGS. 2 and 3, are manufactured from flat plates of metal 35, molding surface 13, an under surface 13a and, in the case of a rectangular mold, four edge surfaces 13b. A ³⁄₃₂ inch thick plate having a surface area sufficient to accommodate the die pattern 14 with a margin of 2 to 3 inches between the edges of the die pattern 14 and the plate 35 has been found satisfactory as a die blank. On the molding surface 13 of this plate 35, the entire die pattern 14 is photographically engraved by methods well known in the art thereby producing the die pattern 14 as a pattern of grooves or depressions 36 in the molding surface 13 of the plate 35. For reasons further explained hereinafter it may in some cases be desirable to exaggerate slightly the depth of the groove 36a corresponding to the outer edge of the finished pattern 14b to appear on the finished article 45, although this will not always be necessary.

In the practice of the instant invention an additional continuous groove 37 not corresponding to any portion of the finished pattern 14b intended to appear on the finished article 45 is provided, as part of the die pattern 14, in the molding surface 13 of the mold 10 external to and closely spaced from the outer edge groove 36a of that portion of the die pattern 14 corresponding to the finished pattern 14b on the finished article 45. This additional groove 37 closely follows each indentation of the outer edge groove 36a of the desired finished pattern 14b and will usually be of substantially the same cross-section. The outer edge groove 36a and the outer groove 37 of the groove pattern 14 thereby define a continuous land 38 of the molding surface 13 between said grooves. The outer groove 37 of the die pattern 14 may be formed by machining the photoengraved die 10 or by photoengraving from the original art work with an additional border line added.

It will be apppreciated that the optimum depths of the grooves 36a and 37 as well as the optimum width of the land 38 therebetween depends upon a number of variables including the thickness of the backing layer or layers and such physical properties of the materials of the pattern layer and backing layer as tensile strength and elongation. With the vinyl plastisols employed by me for both the pattern and the backing sheet it has been found, for example, that a table cloth having a backing layer of .005" thickness may be satisfactorily made using a die 10 provided with grooves 36a and 37 each having a cross-sectional depth of from .040" to .050" and a cross-sectional width of from .040" to .050".

Referring now to FIGS. 4, 5, 6 and 7 and initially to FIG. 4, the intermediate article of manufacture 32 which may be formed on the mold of this invention will be described. In FIG. 4 is shown a mold 10, the die pattern 14 of which is completely filled with the first layer 40 of plastisol, the excess plastisol having been wiped clean from the molding surface 13 of the mold 10. The second or backing layer 41 of plastisol, preferably of a contrasting color, has been applied to the molding surface 13 of the mold 10 completely covering the first layer 40 and extending therebeyond to produce a sheet of excess plastic backing material or flash 41a overlying the outermost groove 37 and surrounding the pattern 14.

After the pattern layer 40 and the backing layer 41 have been cured and cooled on the mold 10 and have been hand stripped from the mold 10 as shown in FIG. 5, the resultant product is the intermediate article of manufacture 32 shown in FIGS. 6 and 7. This intermediate article 32 comprises, in a cured state, the backing sheet 41 of plastic material on one surface of which is superimposed and fused thereto the desired intermediate pattern 14a of beads or ridges of the pattern layer 40 preferably of a contrasting color. The intermediate pattern 14a includes the desired finished pattern 14b, the outer edges of said finished pattern 14b being comprised of a continuous edge bead or pattern bead 42 of said pattern layer 40 completely enclosing said finished pattern 14b and connected to various interior beads thereof to form a part of said finished pattern 14b. Also superimposed on said backing sheet 41 as part of the intermediate pattern 14a is a continuous flash bead 43 of said pattern layer 40 positioned in closely spaced relationship exterior to said edge bead 42 of said finished pattern 14b and completely surrounding the same. The dimensions of the edge bead 42 and the flash bead 43 as well as the space between them will, of course, approximate the corresponding dimensions of the grooves 36a and 37 in the die 10. The unwanted side scrap or flash 41a extends from the interior edge of the flash bead 43 to the edges of the backing sheet 41.

The final method step in finishing the product of the instant invention is shown in FIG. 8. In this step the edge bead 43 may be broken or cut at an appropriate point or folded and said edge bead 43 together with the flash 41a is then manually torn from the finished article 45 to complete the manufacturing process and provide a finished article 45 wherein the edges of the backing layer 41 conform closely to the edge bead 42 of the finished pattern 14b. It should be appreciated that, while a preferred sequence of method steps has been described, the steps shown in FIGS. 5 and 8 could be reversed in that the flash 41a and flash bead 43 could, under appropriate circumstances, be ripped from the finished article 45 while the intermediate article 32 is still in the mold 10. The finished article of manufacture, a place mat 45, is shown schematically in FIGS. 9 and 10.

It will be appreciated that a variety of apparatus generally equivalent to that shown diagrammatically in FIG. 1 could be used in the practice of my method, this invention being unrelated to the specific apparatus illustrated except to the mold or die employed. For instance, other apparatus could be used for applying one or both layers of plastisol or different cooling apparatus could be used. Also, it should be appreciated that the expression "plate" as used herein with reference to the molds or dies includes curved plates as well as flat plates and even a cylinder wall provided with mold cavities.

Further, only the basic method of utilizing my invention has been described herein. Additional layers or laminations could be applied on top of the second or backing layer, curing could be performed between plastisol applications, or the mold stripping and flash stripping steps could be reversed or combined. Also, this invention would be useful in forming interior openings in articles of the character described as well as for providing means for stripping unwanted edge scrap from the desired finished article.

From the foregoing, it is believed that the instant invention will be readily comprehended by persons skilled in the art. It is to be clearly understood, however, that various changes in the apparatus herewith shown and described may be resorted to without departing from the spirit of the invention as defined by the appended claims.

Having thus described my invention, what I claim and desire to protect by Letters Patent is:

1. A mold for the manufacture of substantially planar flexible plastic sheet-like articles having at least one continuous raised plastic bead on one surface thereof, said mold comprising: a plate having a molding surface, an under surface and at least one edge surface, at least one pair of closely spaced continuous grooves provided in said molding surface defining a continuous land of said molding surface therebetween, the land between at least one pair of said closely spaced continuous grooves corresponding with the outer edge of a desired finished article.

2. Apparatus for the manufacture of substantially planar flexible plastic sheet-like articles having a raised pattern of plastic beads on one surface thereof, said apparatus comprising: a plate having a molding surface, an under surface and at least one edge surface, a pattern of grooves for molding said bead pattern provided in said molding surface, said groove pattern including at least one pair of closely spaced continuous grooves defining a continuous land of said molding surface therebetween, the land between at least one pair of said closely spaced continuous grooves corresponding with the outer edge of a desired finished article.

3. A mold for the manufacture of substantially planar flexible plastic sheet-like articles having a raised pattern of plastic beads on one surface thereof, said mold comprising: a plate having a molding surface, an under surface and at least one edge surface, said molding surface being provided with a pattern of grooves for molding said bead pattern, said groove pattern including a pair of closely spaced continuous grooves completely enclosing said groove pattern and forming the outer edge thereof, said pair of continuous grooves defining a continuous land of said molding surface therebetween.

4. A mold for the manufacture of substantially planar flexible plastic sheet-like articles having a raised pattern of interconnected plastic beads on one surface thereof, said mold comprising: a plate having a molding surface, an under surface and at least one edge surface, said molding surface being provided with an interconnected pattern of grooves for molding said bead pattern, said interconnected pattern of grooves including an outer edge groove completely enclosing said interconnected groove pattern, said molding surface being additionally provided with a continuous groove completely surrounding said outer edge groove and substantially uniformly closely spaced therefrom by a continuous land of said molding surface.

5. A mold for the manufacture of substantially planar flexible plastic sheet-like articles having a continuous raised plastic bead on and adjacent to the outer periphery of one surface thereof, said mold comprising: a plate having a molding surface, an under surface and at least one edge surface, a continuous groove provided in said molding surface for molding said continuous bead, an area of said plate recessed from said molding surface completely surrounding said continuous groove and closely spaced with respect thereto, said groove and said recessed area defining therebetween a continuous land of said molding surface, said land corresponding to the edges of a desired finished article.

6. A mold for the manufacture of substantially planar flexible plastic sheet-like articles having an interconnected pattern of raised plastic beads on one surface thereof, said mold comprising: a plate having a molding surface, an under surface and at least one edge surface, said molding surface being provided therein with a pattern of interconnected grooves for molding said interconnected bead pattern, said groove pattern including a continuous groove completely surrounding said interconnected groove pattern and forming the outer periphery thereof, an area of said plate recessed from said molding surface completely surrounding said continuous groove and closely spaced with respect thereto, said continuous groove and said recessed area defining therebetween a continuous land of said molding surface.

References Cited by the Examiner

UNITED STATES PATENTS

| | | | |
|---|---|---|---|
| 457,975 | 8/1891 | Snedekor | 18—39 |
| 1,092,881 | 4/1914 | Wieland | 264—161 |
| 1,999,383 | 4/1935 | Woodall | 161—116 |
| 1,999,796 | 4/1935 | Zinser | 264—161 |
| 2,015,631 | 9/1935 | Spanel | 18—41 |
| 2,100,574 | 9/1937 | Spanel | 18—41 |
| 2,119,791 | 6/1938 | Newman | 18—39 |
| 2,131,728 | 10/1938 | Denman | 161—116 |
| 2,710,046 | 6/1955 | Markus et al. | 161—116 |
| 2,966,437 | 12/1960 | Loui et al. | 18—44 |

J. SPENCER OVERHOLSER, *Primary Examiner.*

DOUGLAS J. DRUMMOND, *Examiner.*

WILLIAM L. McBAY, *Assistant Examiner.*